(12) United States Patent
Hudson et al.

(10) Patent No.: US 10,278,092 B2
(45) Date of Patent: Apr. 30, 2019

(54) APPARATUS AND METHOD FOR COMMUNICATIONS MANAGEMENT

(71) Applicant: BAE SYSTEMS PLC, London (GB)

(72) Inventors: Peter Noble Hudson, Preston (GB); Rania Hamdi Eissa, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 15/748,257

(22) PCT Filed: Aug. 2, 2016

(86) PCT No.: PCT/GB2016/052378
§ 371 (c)(1),
(2) Date: Jan. 29, 2018

(87) PCT Pub. No.: WO2017/025716
PCT Pub. Date: Feb. 16, 2017

(65) Prior Publication Data
US 2018/0220324 A1    Aug. 2, 2018

(30) Foreign Application Priority Data

Aug. 13, 2015  (GB) .................................. 1514454.6
Sep. 2, 2015   (EP) .................................. 15183517

(51) Int. Cl.
H04B 7/14      (2006.01)
H04W 28/02     (2009.01)
(Continued)

(52) U.S. Cl.
CPC .... *H04W 28/0231* (2013.01); *H04B 7/18506* (2013.01); *H04L 45/745* (2013.01);
(Continued)

(58) Field of Classification Search
None
See application file for complete search history.

(56) References Cited

U.S. PATENT DOCUMENTS 2,062,003 A    11/1936  Hammond, Jr.
4,100,472 A     7/1978  Mobley
(Continued)

FOREIGN PATENT DOCUMENTS

EP   0481171 A2   4/1992
EP   0532383 A1   3/1993
(Continued)

OTHER PUBLICATIONS

International Preliminary Report on Patentability of International Application No. PCT/GB2016/052371, dated Feb. 22, 2018, 10 pages.
(Continued)

*Primary Examiner* — Bob A Phunkulh
(74) *Attorney, Agent, or Firm* — Maine Cernota & Rardin

(57) ABSTRACT

Apparatus for communications management in a communications system of a moving platform comprising a plurality of systems and/or functions and at least one platform application, the communications system comprising at least one transmitter for transmitting data received from the at least one platform application and being configured to effect wireless data communication thereof by means of one of a plurality of supported communications links, wherein the apparatus comprises a data management module configured to:
  receive a control message indicative that no suitable communications links are available for transmission of platform application data;
  obtain a classification in respect of platform application data to be transmitted to at least one recipient node;
  determine, from a stored ruleset, an action to be taken in respect of the platform application data according to the respective classification thereof, wherein the action comprises one of storing or discarding the platform application data; and
(Continued)

generate a control signal and transmit the control signal to a platform application from which the platform application data originates, or a QoS interface associated therewith, wherein the control signal is configured to cause the action to be taken thereby.

11 Claims, 8 Drawing Sheets

(51) Int. Cl.
*H04B 7/185* (2006.01)
*H04L 29/08* (2006.01)
*H04L 12/741* (2013.01)
*H04L 12/823* (2013.01)
*H04L 12/927* (2013.01)

(52) U.S. Cl.
CPC ............ *H04L 47/32* (2013.01); *H04L 47/805* (2013.01); *H04L 67/12* (2013.01); *H04L 67/322* (2013.01)

(56) References Cited

U.S. PATENT DOCUMENTS

| | | |
|---|---|---|
| 6,115,580 A | 9/2000 | Chuprun et al. |
| 7,072,977 B1 | 7/2006 | Bernard et al. |
| 8,005,418 B2 | 8/2011 | Walker |
| 8,554,264 B1 | 10/2013 | Gibbons et al. |
| 2002/0142773 A1 | 10/2002 | Rudrapatna et al. |
| 2002/0164981 A1 | 11/2002 | Parkman |
| 2003/0073406 A1 | 4/2003 | Benjamin |
| 2005/0202827 A1 | 9/2005 | Demarco et al. |
| 2006/0030350 A1 | 2/2006 | Mitchell |
| 2006/0168592 A1 | 7/2006 | Andrews et al. |
| 2007/0064604 A1 | 3/2007 | Chen |
| 2007/0168090 A1 | 7/2007 | Demarco et al. |
| 2007/0258445 A1* | 11/2007 | Smith ............... H04L 47/10 370/389 |
| 2007/0258486 A1 | 11/2007 | Smith |
| 2007/0291647 A1* | 12/2007 | Smith ............... H04L 49/90 370/237 |
| 2007/0291767 A1* | 12/2007 | Smith ............... H04L 47/10 370/395.21 |
| 2007/0291768 A1* | 12/2007 | Galluscio ............ H04L 47/10 370/395.21 |
| 2007/0291780 A1* | 12/2007 | Smith ............... H04L 47/10 370/411 |
| 2007/0297416 A1* | 12/2007 | Boley ............... H04L 47/10 370/395.21 |
| 2008/0204279 A1 | 8/2008 | Bourgault |
| 2009/0079631 A1 | 3/2009 | Hurst |
| 2009/0185617 A1 | 7/2009 | Houghton et al. |
| 2009/0326735 A1 | 12/2009 | Wood |
| 2010/0057278 A1 | 3/2010 | Lee |
| 2010/0094485 A1 | 4/2010 | Verlut et al. |
| 2010/0323715 A1 | 12/2010 | Winters |
| 2011/0255506 A1 | 10/2011 | Toth |
| 2012/0078453 A1 | 3/2012 | Daum et al. |
| 2012/0257657 A1 | 10/2012 | Subrahmanya et al. |
| 2012/0268319 A1 | 10/2012 | Mitchel |
| 2013/0041529 A1 | 2/2013 | He |
| 2013/0095822 A1 | 4/2013 | Swardh |
| 2013/0324070 A1 | 12/2013 | Bennett et al. |
| 2014/0014787 A1 | 1/2014 | Chen |
| 2014/0075506 A1 | 3/2014 | Davis |
| 2014/0142787 A1 | 5/2014 | Tillotson |
| 2014/0218239 A1 | 8/2014 | Sharawi et al. |
| 2014/0226584 A1 | 8/2014 | Cullen et al. |
| 2014/0274180 A1 | 9/2014 | DuBois |
| 2014/0323038 A1 | 10/2014 | Hubbel et al. |
| 2015/0102953 A1 | 4/2015 | Stayton |
| 2015/0120087 A1 | 4/2015 | Duan |
| 2015/0210387 A1 | 7/2015 | Ling |
| 2015/0229376 A1 | 8/2015 | Kikuchi |
| 2017/0034277 A1* | 2/2017 | Jackson ............... H04L 67/12 |
| 2017/0283038 A1 | 10/2017 | Lin |

FOREIGN PATENT DOCUMENTS

| | | |
|---|---|---|
| EP | 1519507 A2 | 3/2005 |
| EP | 1630978 A2 | 3/2006 |
| EP | 2228868 A1 | 9/2010 |
| EP | 2378676 A1 | 10/2011 |
| EP | 2450862 A1 | 5/2012 |
| EP | 2469291 A1 | 6/2012 |
| EP | 2779480 A2 | 9/2014 |
| EP | 2822187 A1 | 1/2015 |
| EP | 2869479 A1 | 5/2015 |
| EP | 2933931 A2 | 10/2015 |
| GB | 2493779 A | 2/2013 |
| JP | 2001153596 A | 6/2001 |
| JP | 2010171496 A | 8/2010 |
| TW | 201321916 A | 6/2013 |
| WO | 2006130272 A2 | 12/2006 |
| WO | 2007021411 A2 | 2/2007 |
| WO | 2007110607 A1 | 10/2007 |
| WO | 2010147986 A1 | 12/2010 |
| WO | 2011075869 A1 | 6/2011 |
| WO | 2012145570 A1 | 10/2012 |
| WO | 2015117284 A1 | 8/2015 |

OTHER PUBLICATIONS

International Preliminary Report on Patentability of International Application No. PCT/GB2016/052374, dated Feb. 22, 2018, 8 pages.
International Preliminary Report on Patentability of International Application No. PCT/GB2016/052484, dated Feb. 22, 2018, 7 pages.
International Preliminary Report on Patentability of International Application No. PCT/GB2016/052480, dated Feb. 22, 2018, 8 pages.
International Preliminary Report on Patentability of International Application No. PCT/GB2016/052481, dated Feb. 22, 2018, 8 pages.
International Preliminary Report on Patentability of International Application No. PCT/GB2016/052401, dated Feb. 22, 2018, 8 pages.
International Preliminary Report on Patentability of International Application No. PCT/GB2016/052400, dated Feb. 22, 2018, 7 pages.
International Preliminary Report on Patentability of International Application No. PCT/GB2016/052378, dated Feb. 22, 2018, 7 pages.
International Preliminary Report on Patentability of International Application No. PCT/GB2016/052483, dated Feb. 22, 2018, 9 pages.
International Search Report and Written Opinion of International Application No. PCT/GB2016/052371, dated Oct. 26, 2016, 14 pages.
Great Britain Search Report under Section 17 of Great Britain Application No. GB1514451.2, dated Feb. 15, 2016, 3 pages.
Extended European Search Report of European Application No. EP15183514, dated Mar. 2, 2016, 10 pages.
International Search Report and Written Opinion of International Application No. PCT/GB2016/052374, dated Oct. 13, 2016, 12 pages.
Great Britain Search Report under Section 17 of Great Britain Application No. GB1514452, dated Jan. 26, 2016, 4 pages.
Extended European Search Report of European Application No. EP15183519, dated Mar. 3, 2016, 8 pages.
International Search Report and Written Opinion of International Application No. PCT/GB2016/052378 dated Oct. 24, 2016, 11 pages.
Great Britain Search Report under Section 17 of Great Britain Application No. GB1514454.6, dated Jan. 28, 2016, 3 pages.

(56) References Cited

OTHER PUBLICATIONS

European Search Report of European Application No. EP15183517, dated Mar. 1, 2016, 8 pages.
International Search Report and Written Opinion of International Application No. PCT/GB2016/052379, dated Oct. 18, 2016, 10 pages.
Great Britain Search Report under Section 17 of Great Britain Application No. GB1514455.3, dated Mar. 18, 2016, 4 pages.
European Search Report of European Application No. EP15183723, dated Mar. 3, 2016, 6 pages.
International Search Report and Written Opinion of International Application No. PCT/GB2016/052400, dated Oct. 18, 2016, 12 pages.
Great Britain Search Report under Section 17 of Great Britain Application No. GB1514457.9, dated Mar. 18, 2016, 3 page.
European Search Report of European Application No. EP15183720, dated Mar. 4, 2016, 8 pages.
Chen-Mou Cheng et al: "Transmit Antenna Selection Based on Link-layer Channel Probing", World of Wireless, Mobile and Multimedia Networks, 2007. WOWMUM 2007. IEEE International Symposium on A, IEEE, PI, Jun. 1, 2001, pp. 1-6 XP031149144.
International Search Report and Written Opinion of International Application No. PCT/GB2016/052401, dated Oct. 14, 2016, 12 pages.
Great Britain Search Report under Section 17 of Great Britain Application No. GB1514459.5, dated Jan. 28, 2016, 4 pages.
European Search Report of European Application No. EP15183731, dated Mar. 9, 2016, 8 pages.
International Search Report and Written Opinion of International Application No. PCT/GB2016/052481, dated Nov. 2, 2016, 12 pages.
Great Britain Search Report under Section 17 of Great Britain Application No. GB1514460.3, dated Jan. 27, 2016, 3 pages.
Great Britain Search Report under Section 17 of Great Britain Application No. GB1613746.5, dated Jan. 30, 2017, 5 pages.
European Search Report of European Application No. EP15184038, dated Mar. 2, 2016, 9 pages.
International Search Report and Written Opinion of International Application No. PCT/GB2016/052483, dated Oct. 28, 2016, 13 pages.
Great Britain Search Report under Section 17 of Great Britain Application No. GB1514461.1, dated Jan. 29, 2016, 3 pages.
Great Britain Search Report under Section 17 of Great Britain Application No. GB1613747.3, dated Jan. 6, 2017, 5 pages.
European Search Report of European Application No. EP15184043, dated Mar. 7, 2016, 10 pages.
International Search Report and Written Opinion of International Application No. PCT/GB2016/052480, dated Oct. 28, 2016, 12 pages.
Great Britain Search Report under Section 17 of Great Britain Application No. GB1514462.9, dated Mar. 18, 2016, 3 pages.
European Search Report of European Application No. EP15184044, dated Mar. 10, 2016, 8 pages.
International Search Report and Written Opinion of International Application No. PCT/GB2016/052484, dated Oct. 18, 2016, 12 pages.
Great Britain Search Report under Section 17 of Great Britain Application No. GB1514465.2, dated Mar. 17, 2016, 3 pages.
European Search Report of European Application No. EP15184074, dated Mar. 4, 2016, 8 pages.
International Preliminary Report on Patentability of International Application No. PCT/GB2016/052379, dated Feb. 22, 2018, 7 pages.

* cited by examiner

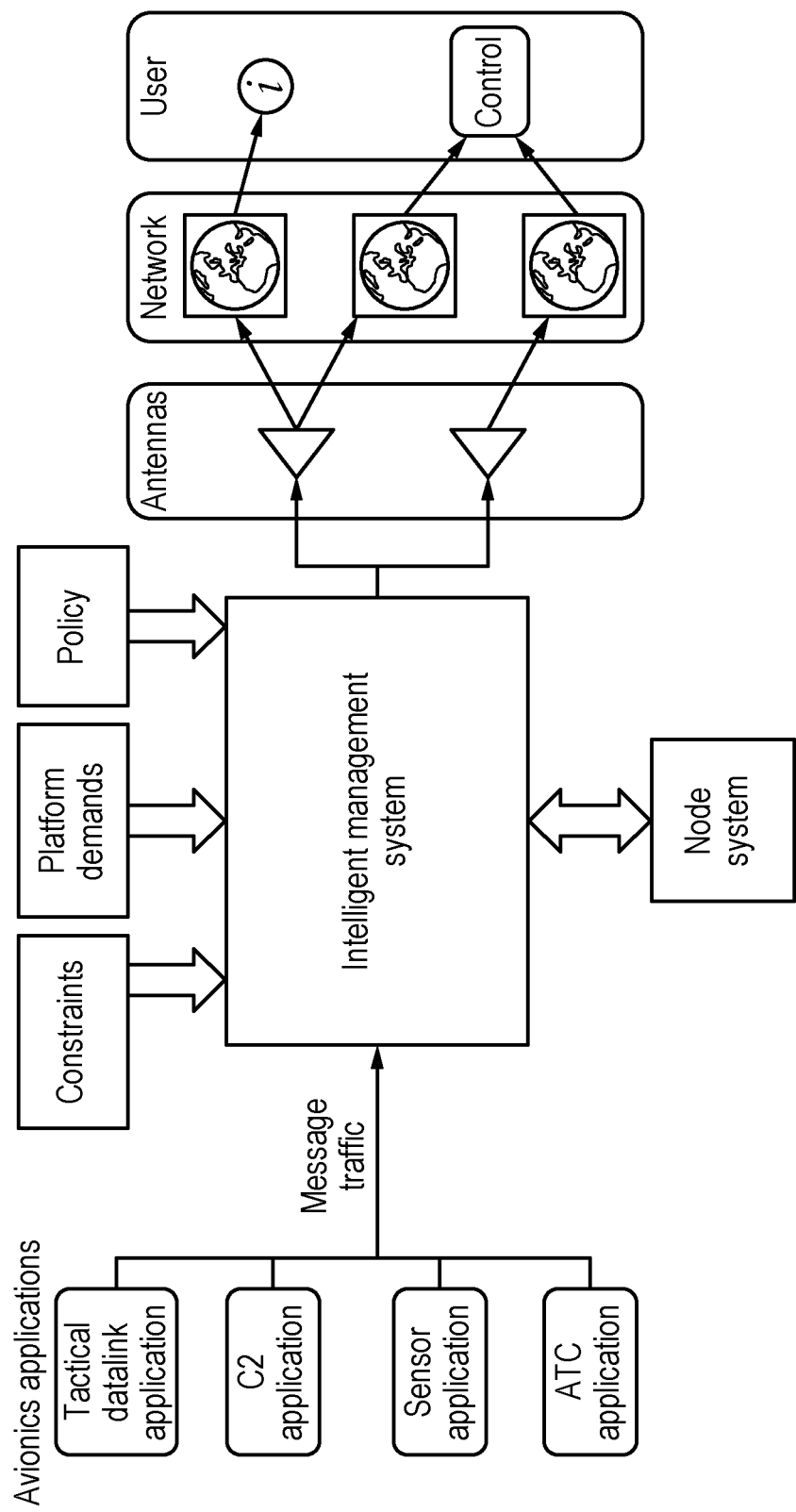

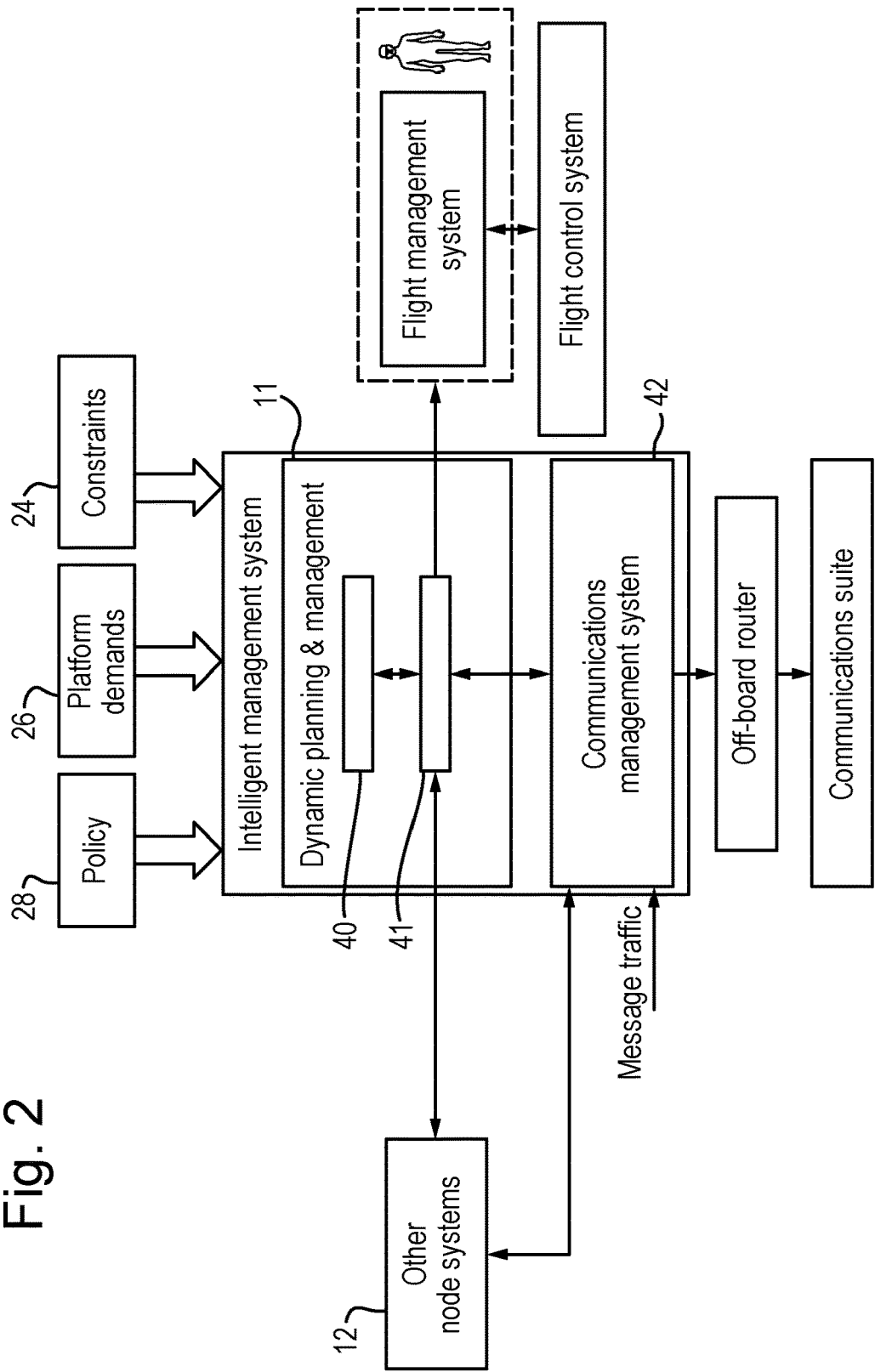

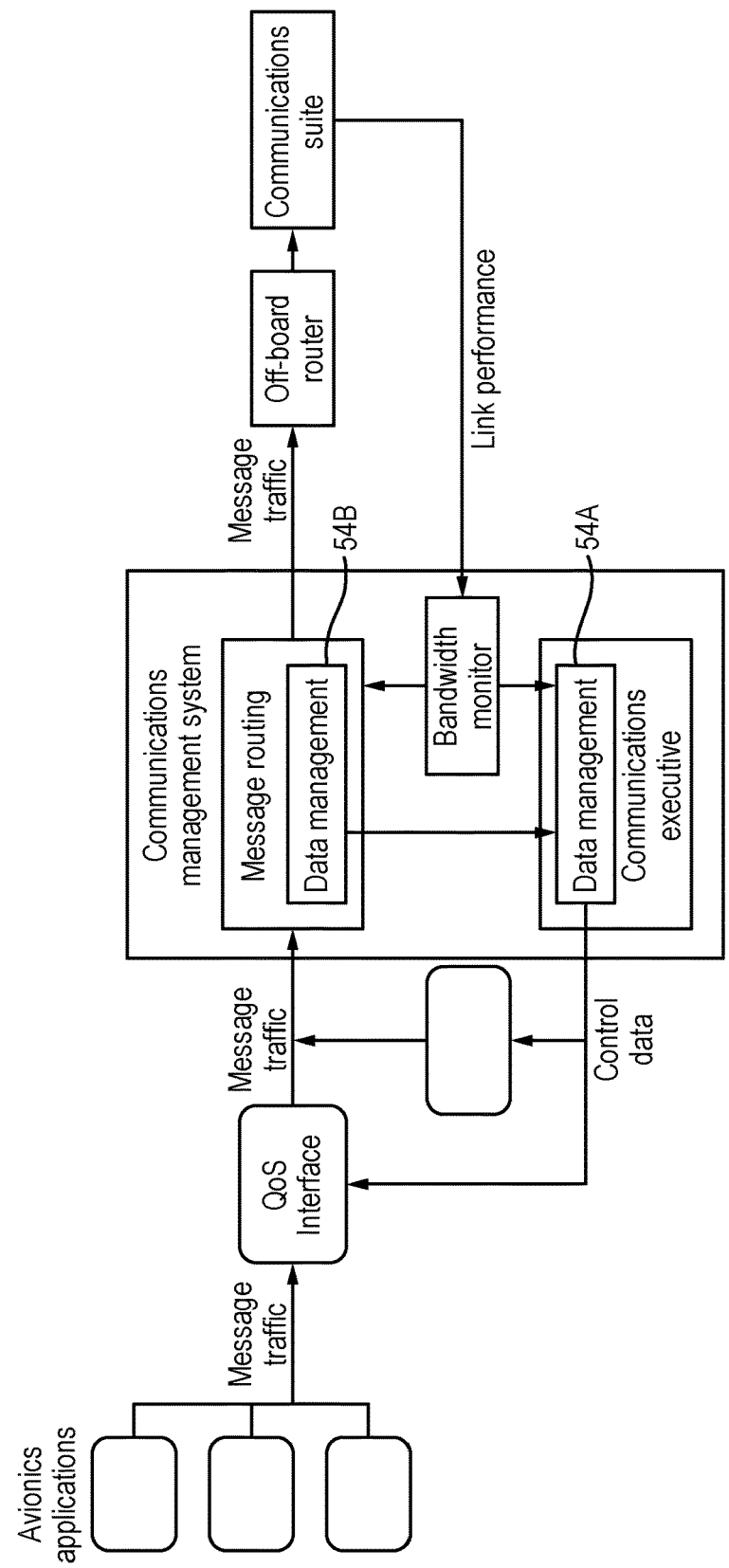

APPARATUS AND METHOD FOR COMMUNICATIONS MANAGEMENT

RELATED APPLICATIONS

This application is a National Phase application filed under 35 USC § 371 of PCT Application No. PCT/GB2016/052378 with an International filing date of Aug. 2, 2016, which claims priority of GB Patent Application GB1514454.6 filed Aug. 13, 2015 and EP Patent Application EP15183517.0 filed Sep. 2, 2015. Each of these applications is herein incorporated by reference in their entirety for all purposes.

FIELD OF THE INVENTION

This invention relates generally to an apparatus and method for communications management and information management and, more particularly, but not necessarily exclusively, to an apparatus and method for management of wireless communications resources between a moving platform and at least one target.

BACKGROUND

There are many applications in which it is required to apply a level of management in respect of wireless communications, particularly between a moving platform and a remote target, and maintain adequate wireless communications therebetween for safe operation of the moving platform and mission success.

For example, in the case of aerial vehicles and, more particularly, unmanned aerial vehicles (UAVs), there is an ongoing and stringent requirement to maintain an adequate communications link between the aerial vehicle and a ground station, for example, and unexpected loss or degradation of such a communication link can be catastrophic.

A UAS is composed of three main parts, the unmanned air vehicle (UAV), unmanned control station (UCS) and support systems of the UAS (for pre-mission planning). A UAS Mission System may be composed of the following functional components/subsystems: Mission Management, Communications, Vehicle Health, Navigation System, Airspace Integration, Payload and Power Management. Multiple, different dynamic in-mission planners may reside in one or more of the above-mentioned functional components/subsystems. In a typical UAV, a dynamic route planner generates a new route, in real time, when there is a change in the operational environment, e.g. severe weather, threat, or a change of circumstances, e.g. an emergency, or a dynamic manoeuvre plan is generated to avoid an airborne obstacle. The aim is thus to maintain safety and the survivability of the aircraft by determining a feasible route and/or manoeuvre in real time, while avoiding pop-up, static and dynamic obstacles, for example.

However, the operational environment of moving platforms, at least in some applications, can be particularly challenging from a communications perspective.

The conditions in such environments lead to severe degradation or link failure due to unexpected events, such as platform manoeuvre, interference, jamming, emissions control and weather. So, for link failure, the platform becomes disconnected from the rest of the network. In other words, the platform cannot transmit the information it has to the recipient. This kind of situation can be either temporary or permanent, depending on the cause of the failure. Current systems, the transmitting platform applications continue to transmit their data for off-board transmission, unaware of the network condition. As a result, the transmitting platform applications may overwhelm the buffers within the network router, leading to the loss of critical information. Transmitting platform applications need to manage their information in light of the prevailing situation, by storing higher-priority information until it can be delivered at a later time, either during mission execution or when the platform returns to base. For lower priority information, the platform application may decide to discard the information instead of storing it until the communications problem is resolved. It would, therefore, be desirable to provide an intelligent communications system that is able to adapt and respond dynamically to unexpected events, and provide a method whereby various platform applications and platform systems can respond to prevailing network conditions.

SUMMARY

It is, therefore, an object of at least some aspects of the present invention to address at least one or more of these issues and, in accordance with a first aspect of the invention, there is provided apparatus for communications management in a communications system of a moving platform comprising a plurality of systems and/or functions and at least one platform application, said communications system comprising at least one transmitter for transmitting data received from said at least one platform application and being configured to effect wireless data communication thereof by means of one of a plurality of supported communications links, wherein said apparatus comprises a data management module configured to:

receive a control message indicative that no suitable communications links are available for transmission of platform application data;
  obtain a classification in respect of platform application data to be transmitted to at least one recipient node;
  determine, from a stored ruleset, an action to be taken in respect of said platform application data according to said respective classification thereof, wherein said action comprises one of storing or discarding said platform application data; and
  generate a control signal and transmit said control signal to a platform application from which said platform application data originates, or a QoS interface associated therewith, wherein said control signal is configured to cause said action to be taken thereby.

In an exemplary embodiment, the apparatus may be configured to identify said platform application from which said platform application data originates, or a QoS interface associated therewith, and determine the address thereof, prior to transmitting said control signal thereto. The address may be determined by accessing a look-up table.

Optionally, the apparatus may be configured to receive said control message from one or more wireless communications links and/or systems and/or functions of said moving platform.

The above-mentioned action may include one or more of discarding said platform application data, transmitting said platform application data when an available communications link is identified, and informing a platform application from which said platform application data originated that a service cannot be provided for its messages.

The apparatus of the present invention may, in accordance with an exemplary embodiment, include said stored ruleset containing data representative platform application data classifications and respective actions to be taken in respect thereof.

Optionally, the stored ruleset may comprise a look-up table consisting of platform application data classifications, and respective actions to be taken in respect thereof.

In an exemplary embodiment, the apparatus may be configured to identify stored platform application data and determine if it has expired and, if so, generate a control signal configured to cause said platform application data to be discarded or re-transmitted.

The apparatus may, optionally, be configured to receive a further control message indicative that a suitable communications link is subsequently available for transmission of platform application data, and, in response to said further control message, generate a further control signal configured to cause a data storage system of said platform to release stored platform application data and cause subsequent transmission of said platform application data to resume.

The control message may be representative of a network condition above or below a performance threshold in respect of one or more wireless communications links.

In accordance with another aspect of the present invention, there is provided a communications system for a moving platform having a plurality of platform applications, the communications system comprising at least one transmitter for transmitting data received from said platform applications and being configured to effect wireless communication thereof by means of one of a plurality of supported communications links, and further comprising apparatus substantially as described above.

In accordance with yet another aspect of the present invention, there is provided a method for communications management in a communications system of a moving platform comprising at least one platform application, said communications system comprising at least one transmitter for transmitting data received from said at least one platform application and being configured to effect wireless data communication thereof from said transmitter by means of one of a plurality of supported communication links, the method comprising:
- receiving a control message indicative that no suitable communications links are available for transmission of platform application data;
- obtaining a classification in respect of platform application data to be transmitted to at least one recipient node;
- determining, from a stored ruleset, an action to be taken in respect of said platform application data according to said respective classification or message priority thereof, wherein said action comprises one of storing or discarding said platform application data; and
- generating a control signal and transmitting said control signal to a platform application from which said platform application data originates, or a QoS interface associated therewith, wherein said control signal is configured to cause said action to be taken thereby.

BRIEF DESCRIPTION OF THE FIGURES

These and other aspects of the present invention will be apparent from the following specific description in which embodiments of the present invention are described, by way of examples only, and with reference to the accompanying drawings, in which:

FIG. 1 is a schematic block diagram illustrating a moving platform system, including apparatus according to an exemplary embodiment of the present invention;

FIG. 2 is a schematic block diagram illustrating some principal features of the moving platform system of FIG. 1 in more detail;

FIGS. 5A and 5B are schematic block diagrams illustrating a communications system including a data management module according to respective first and second exemplary embodiments of the present invention.

DETAILED DESCRIPTION

Figure 3A:
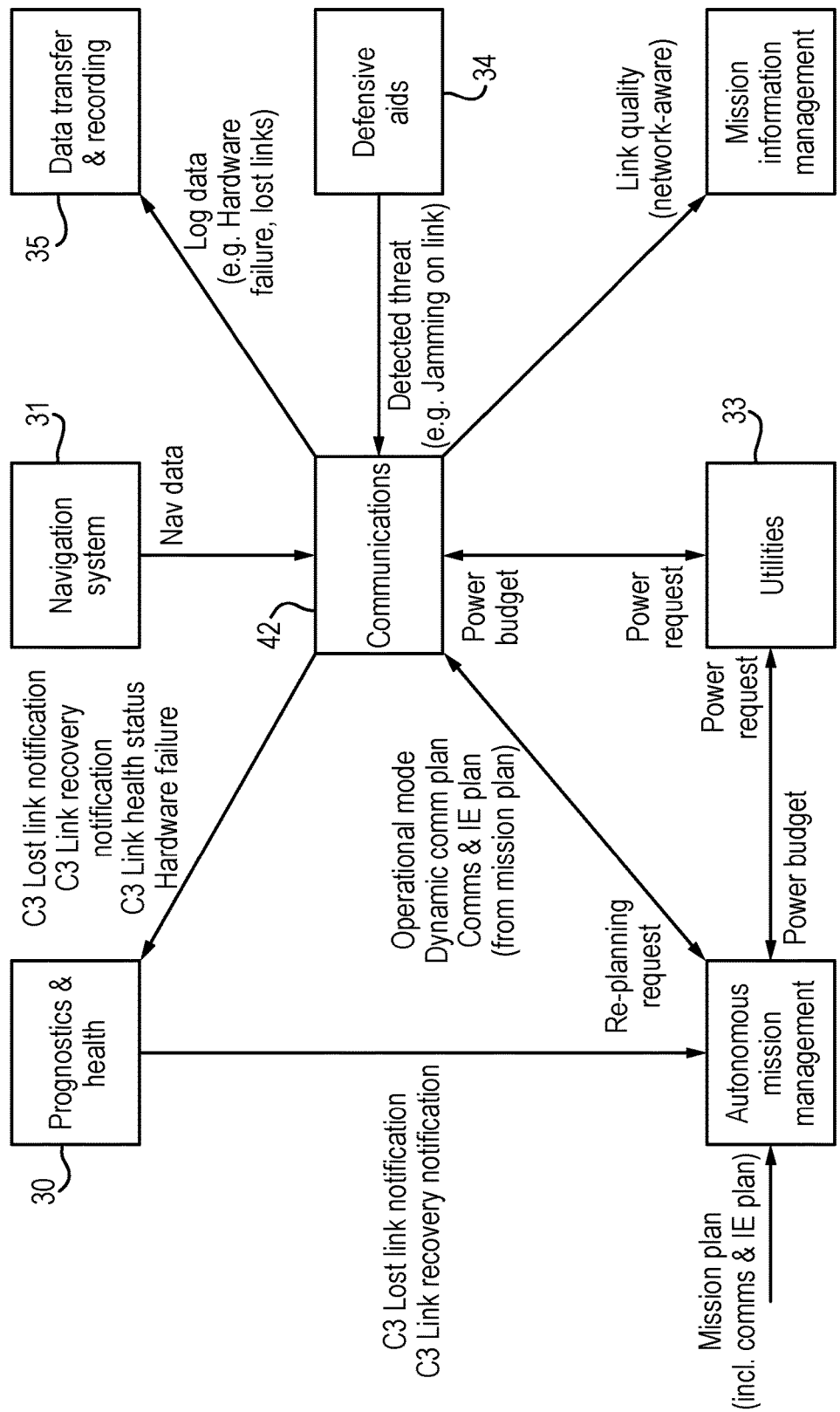
FIG. 3A is a schematic block diagram illustrating the data connections of an intelligent communication management system, including apparatus according to an exemplary embodiment of the present invention, in an air-based system.

Exemplary embodiments of the present invention provide an information management module configured to provide a degree of situational/environmental awareness to communications, thereby contributing to the overall objective of maintenance of adequate communications throughout a mission, taking into account any unexpected degradation or loss of a wireless data link in real (or near real) time.

Traditionally, all aspects of communications, such as multiple, different communications links/radios, reside within the communications system. Each of the communications links/radios is an independent system and usually dedicated to transmitting specific messages. The communications system is usually a dedicated system without much interaction, if not all, with other platform systems and platform applications on the platform. For example, when a link failure occurs, the transmitting platform applications continue to transmit their data for off-board transmission, unaware of the performance of the network. As a result, the transmitting applications may overwhelm the off-board network router (e.g. buffers), leading to the loss of critical data. Platform applications would need to react to the changes. Also, data storage on the platform is precious and must be managed carefully. Hence, not all data that is produced by the platform applications is stored. In contrast, in aspects of the present invention, it is recognised that all systems/subsystems on a platform may work in concert to achieve mission objectives and to maintain the integrity of the platform. Specifically, in this case, the communications management system works in concert with platform applications, enabling them to store valuable information under adverse conditions until they can be delivered when network conditions improve, and to prevent overwhelming the network routing function with messages that cannot be transmitted.

Thus, in one exemplary embodiment, it is recognised that all systems/subsystems on a platform (e.g. mission management, communications, airspace integration, and vehicle health management) on both aircraft and ground-based systems work in concert to achieve mission objectives and to maintain integrity of the platform, and in particular the communications management system works with platform applications (and/or QoS interface) to adapt and respond to prevailing conditions. When conditions are particularly poor, and communications links are lost or severely degraded for a period of time, the apparatus is configured to work with platform applications to store (unsent) critical information (such as mission-critical, non-time sensitive) or to drop non-critical messages, for example. When an adequate network connection is re-established, the stored information can then be retrieved for off-board transmission and platform applications can resume transmission as normal. Otherwise, as in prior art systems, platform applications continue to send their information to the network routeing function, which can overwhelm it and lead to loss of critical information.

The operational environment of a moving platform, in many different applications, comprises a plurality of nodes (e.g. fixed/mobile control station, manned and/or unmanned air vehicles) interacting with each other via different networks, exchanging, for example, Command and Control (C2), maintaining situational/environmental awareness, and cooperatively working together. In general, a node has multiple data links/radios to enable it to interact with other nodes via different networks, as required.

In the following description of the drawings, a communications management apparatus according to an exemplary embodiment of the invention will be described in relation to a UAV. However, it is to be understood that the present invention is not necessarily intended to be limited in this regard and, indeed, finds application in many other types of mobile vehicle and fixed infrastructure systems in which it is required to manage communications in an intelligent manner and, for the avoidance of doubt, this would include manned and unmanned road and sea-going vehicles, ground- and airborne-control based infrastructure, as well as manned aerial vehicles.

Referring to FIG. 1 of the drawings, an intelligent management module 10, including apparatus according to an exemplary embodiment of an aspect of the present invention, is illustrated schematically at the centre of a typical UAV. Referring to FIG. 1 of the drawings, an intelligent management module 10, including apparatus according to an exemplary embodiment of an aspect of the present invention, is illustrated schematically at the centre of a typical UAV. The UAV comprises a plurality of systems/subsystems, including communications, navigation system, prognostics and health, etc. Thus, in the schematic diagram of FIG. 1, the intelligent communications management module 10 is incorporated in a first node and depicted as being communicably coupled to other parts 12 of the vehicle. It can be seen from the diagram that two-way data communication is provided between the rest of the vehicle 12 and the intelligent management module 10. The node system 12 may comprise a plurality of systems/subsystems, possibly including, but not necessarily limited to, a prognostics and health system, a navigation system, a control authority, e.g. pilot or an on-board authority with executive decision functionality, a utilities management system, defensive aids system, data transfer and recording system, and an HMI (Human Machine Interface) system. Any and all of these functional components are configured to provide information, such as navigation data and detected threat, to the intelligent communications management module 10 for use in its decision making.

The intelligent communications management module 10 is also configured to receive data from a plurality of platform applications. Such platform applications may, for example, comprise civil and/or military applications, such as tactical datalink applications 14, sensor applications 16 (e.g. video, images), mission management applications 18 (for example, command and control data), and platform management applications 20 (e.g. health of node). It will be appreciated that this is not a comprehensive list of typical or possible applications from which the intelligent communications management system may receive data and others will be apparent to a person skilled in the art, depending upon the specific application within which the present invention is to be employed.

The intelligent communications management module 10 is configured to manage multiple communications links (generally depicted in FIG. 1 as 'network' 21), which may include (but are not limited to) tactical data links, satellite links, free space optical links and other data links, as will be apparent to a person skilled in the art, and it may have different antenna types (depicted generally at 22) to manage including, but not limited to, omni-directional and directional antennas, fixed or beam-steerable antennas. The antennas may be shared between communications links/radios, or with sensor systems. In the example illustrated in FIG. 1, the communications from the platform antennas 22 are directed at an end user 23, for example, the remote pilot of a UAV located at a ground station. However, communications are not necessarily intended to be in any way limited in this regard.

Thus, the Intelligent Communications Management System has access to a wealth of information, such as mission environment and internal state of the node, and uses this information in its decision making. The environment represents the systems knowledge about the outside world, including network and link performance, other nodes in the network environment, dynamic threats, terrain, obstacles and weather data. The internal state is a representation of the internals of the system. It collects internal data from contributing sub-systems, such as real-time node attitude and position, current operational mode and applications' communications requirements, and it retains communications/information exchange plans, policies and information about installed resources (e.g. communications links, antennas).

A database (not shown) provides the intelligent communications management module 10 with knowledge about its mission environment and internal state, and uses this information in its decision making. The environmental data represents the system's knowledge about the outside world, including network and link performance, other nodes in the network environment, dynamic threats, terrain, obstacles and weather data. The internal state is a representation of the internal sub-systems of the system. The database collects internal data from contributing sub-systems, such as real-time node attitude and position, current operational mode and the communications requirements of individual applications, and it retains communications/information exchange plans, policies and information about installed resources (e.g. communication systems, antennas). For example, the antenna gain patterns for each installed antenna on a node would be stored on each node, in a database for example, to be used by the intelligent communications management module 10 in respect of, for example, antenna selection. In this example, the antenna gain patterns are mapped with respect to the body reference frame of the node, i.e. location of the antenna on the node.

It will be appreciated that the term "database" used above, is used simply to define one or more repositories for the required data. In one exemplary embodiment, the database may be a single repository, provided on the intelligent management module 10 (or at least dedicated thereto) in which all of the aforementioned data is stored for use thereby. In other exemplary embodiments, such a single repository may be used to store only a sub-set of the data, such as policies and installed antenna performance, to be accessed as required, with data that changes dynamically during a flight or mission, such as node position and operational mode, being sent directly from a relevant part of the overall platform management system to the intelligent communications management module.

Also illustrated in FIG. 1, are data inputs representative of constraints 24, platform demands, and policy 28. These factors and the manner in which data representative thereof can be obtained will be known to a person skilled in the art. The policy 28, for example, may be designed by the network designer. A copy of this policy may reside within the intelligent management module 10, or accessible thereby. The policy contains a set of rules that, for example, define how links and antennas can be used, what action to take in the event of a hardware fault and/or loss of signal, and how platform applications can be served to support the mission. Such rules may be expressed as condition-action pairs (i.e. IF condition THEN action) and/or in look-up tables.

Referring now to FIG. 2 of the drawings, the intelligent management module 10 comprises a dynamic planning and management module 11 and a communications management system 42.

In the example shown, the dynamic planning and management module 11 comprises a dynamic planner 40 and a manager 41, that provides an interface between the dynamic planner 40 and the communications management system 42.

Figure 3B:
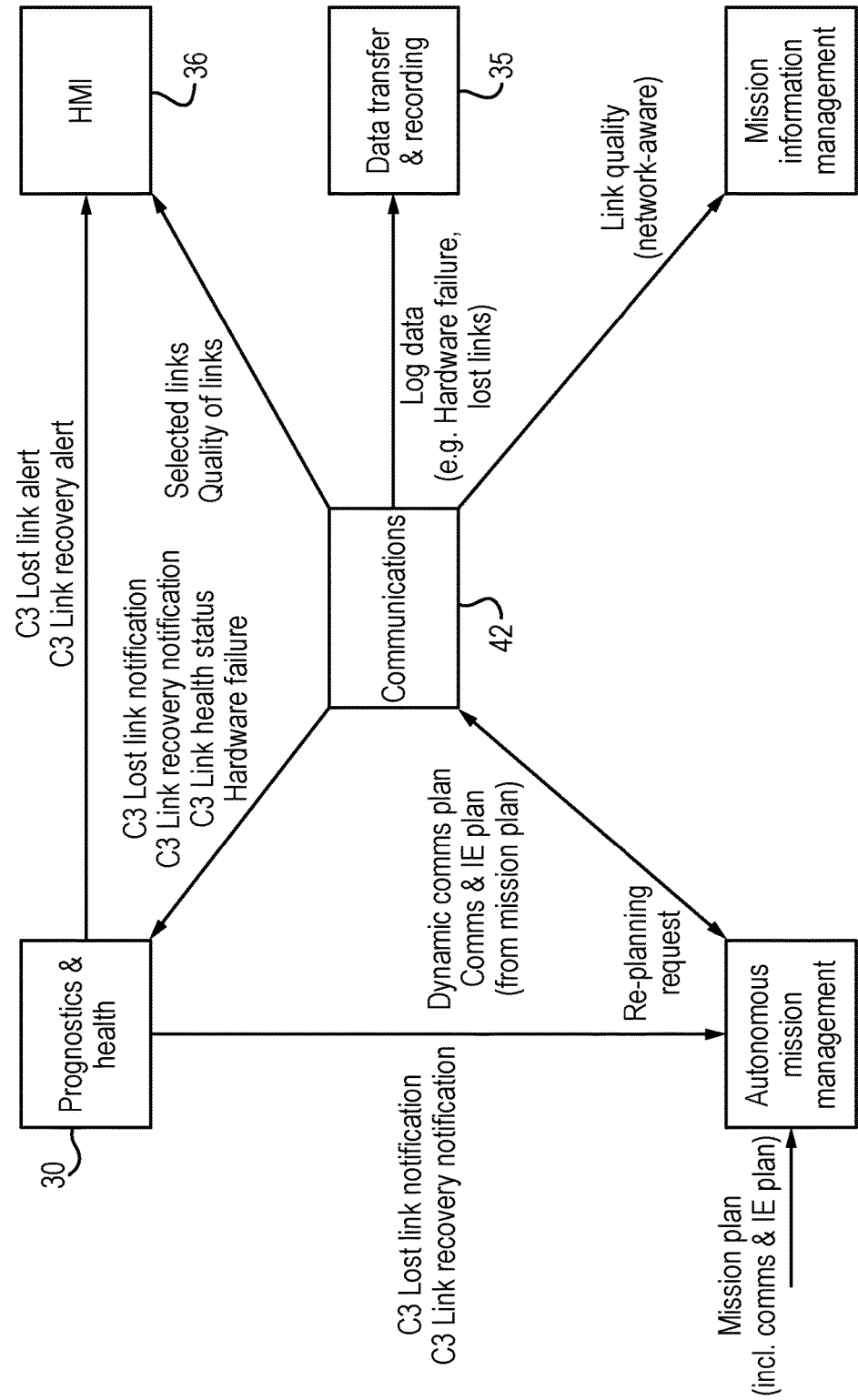
FIG. 3B is a schematic block diagram illustrating the data connections of an intelligent communication management system, including apparatus according to an exemplary embodiment of the present invention, in a ground-based system/airborne control station.

In exemplary embodiments of the present invention, at least parts of the node system 12 are communicably coupled to the communications management system 42 and the intelligent communications management system 10 works cooperatively with the rest of the platform systems/subsystems to achieve the mission goal: to provide information for situational awareness and safety purposes, and to receive information used in its decision making. FIGS. 3A and 3B depict schematically this interaction for air-based systems and ground-based systems/airborne control station respectively. As explained above, the node system 12 may comprise one or more of a prognostics and health system 30, a navigation system 31, a control authority 32, e.g. pilot node, a utilities management system 33, defensive aids system 34, data transfer and recording 35 system, and an HMI (Human Machine Interface) 36 system.

The intelligent communications management system 10 receives a large quantity of information from different parts of the platform, which it can use in its decision-making processes, as described in more detail below. It is consequently mission-, motion-, and network-aware and understands what resources it has to manage, as well as their performance capability. Mission-awareness provides information on what the platform is trying to achieve. There can be various operational modes, that might include normal operation, reconnaissance, under attack, attack, taxiing, landing, etc. This is common to the entire platform and is of particular concern to the communications module 42. The communications module 42 monitors and evaluates current network performance, so it is network-aware. Network awareness information may also be shared with the dynamic planning and management 11 for planning purposes. Motion-awareness enables communications module 42 to intelligently route information along the best path to ensure connectivity to a fixed and/or mobile node is maintained, for example, in response to an unexpected and possibly a sharp manoeuvre. The dynamic planning and management 11 is also motion-aware, in that it may receive a priori future route and/or manoeuvre plan in order to assess its impact on communications and to select suitable communications link (s), including antennas. The dynamic planning and management 11 is aware of other platform demands, such as emission demands. It is thus, mission-, network-, motion- and platform-aware, enabling the intelligent communications management system 10 to dynamically adapt and respond to unexpected events, e.g. change in mission priorities, mission environment and network conditions.

Referring back to FIG. 2 of the drawings, dynamic planners are also widely known and used in many different applications. A dynamic planner is typically provided in respect of, for example, a UAV for planning its route/path, from a start point (typically, but not always) to a defined end point (and optionally including any defined waypoints therebetween), as well as planning its manoeuvre and/or trajectory. Known dynamic planners (path, manoeuvre and trajectory) tend to base their calculation on several factors, such as terrain, threat, weather, and platform constraints, etc. For example, a manoeuvre may be calculated to avoid an airborne obstacle or a path calculated to avoid detection of the UAV. Other types of dynamic planners for route planning in many different applications will be known to a person skilled in the art and the present invention is not necessarily intended to be limited in this regard.

However, in prior art systems, the impact on communications is not taken into account during dynamic path and/or manoeuvre planning. In addition, the need to perform dynamic planning to benefit communications, when there has been a loss of communication or severe degradation or to avoid detection, for example, has not been considered.

Figure 4:
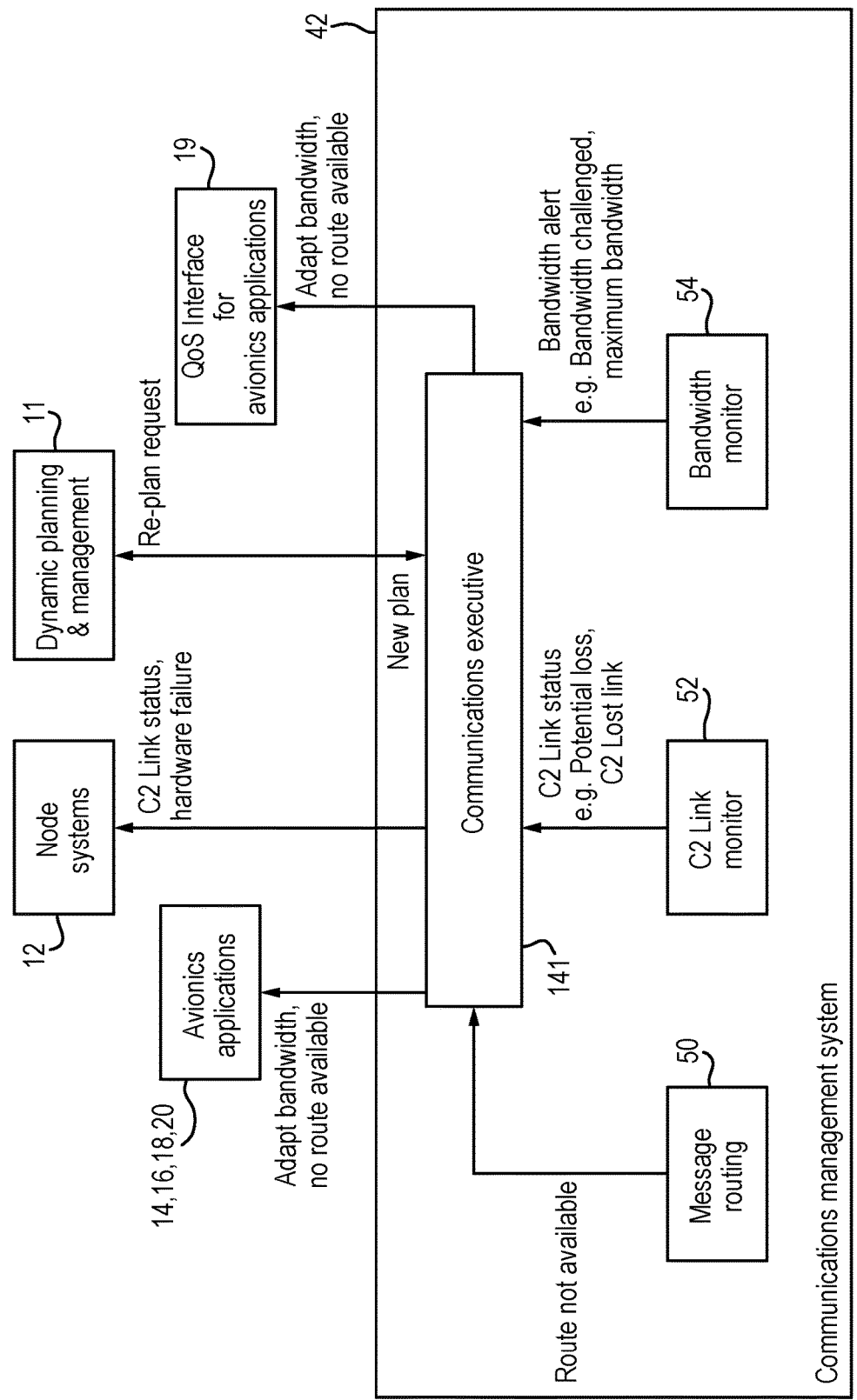
FIG. 4 is a schematic block diagram illustrating a communications executive function including apparatus according to an exemplary embodiment of the present invention.

In this specific exemplary embodiment of the present invention and referring to FIG. 4 of the drawings, a Communications Executive function 141 may be provided that can interface with platform applications and/or QoS Interface and/or other platform systems (e.g. data storage system) to respond to prevailing network conditions Thus, as shown, the Communications Executive function 141 is provided within the communications management system 42 to enable it to interface with components internal and external to the communications management system 42. Internal components of the communications management system 42 include a message routing module 50, a C2 (command and control) monitor 52 and a bandwidth monitor 54. The Communications Executive function 141 is configured to manage plan requests and receive new plans (in some exemplary embodiments), work with platform applications 14, 16, 18, 20 and/or a QoS interface 19 for platform applications, receive health reports and report health issues that may have an impact on a mission. In general, if the communications management module 42 cannot adapt to meet current platform demands using integrated low-level planning functionality, then higher-level planning, via the Communications Executive function 141, may be invoked.

Networks can be volatile and available bandwidth can significantly change, without prior warning. Thus, as previously explained, the bandwidth can change dynamically due to, for example, interference, jamming and weather. Unlike wired mediums, such as Ethernet and the like, current off-board communications links have a much limited bandwidth. For example, current tactical data links have limited bandwidth, of the order of kbits/second. Effective communications can be quickly hindered if the bandwidth is further constrained due to dynamic environmental factors and, in this case, the data management module according to an exemplary embodiment of the present invention is intended to alleviate the problems.

The data management module according to an exemplary embodiment of the invention is configured to effect management of the application data to be transmitted when network resources are constrained or challenged, so as to prevent loss of critical information, as a result of buffer overflow in the routeing function. Thus, for example, in the event that a link is determined to be lost or severely degraded, the data management module may inform (at least selected) platform applications that their messages are not being transmitted, and cause one of a number of actions in respect of the unsent messages to be taken, according to the class or type of message and/or message priority. When the network condition has been restored to an acceptable level, application data transmission can be resumed, and stored data can then be transmitted.

In one embodiment, there is one data management module that may reside within either the Communications Executive 141 or the message routeing function 50. In another embodiment, there may be more than one data management module, each having specific roles. For example, a data management module may reside within the message routeing function in order to discard expired messages buffered in its router. In another example, the data management module within the message routeing function may identify that there is no suitable communications links and alerts the transmitting platform application, via another data management module within the Communications Executive. In other exemplary inventions, the message routeing function may have a management function, of which data management is a sub-function, responsible for: updating the routeing table as to how to route a message; interfacing with transmitting platform applications (as explained above); and requesting higher-planning (e.g. directly or indirectly via a Communications Executive function).

Figure 5B:
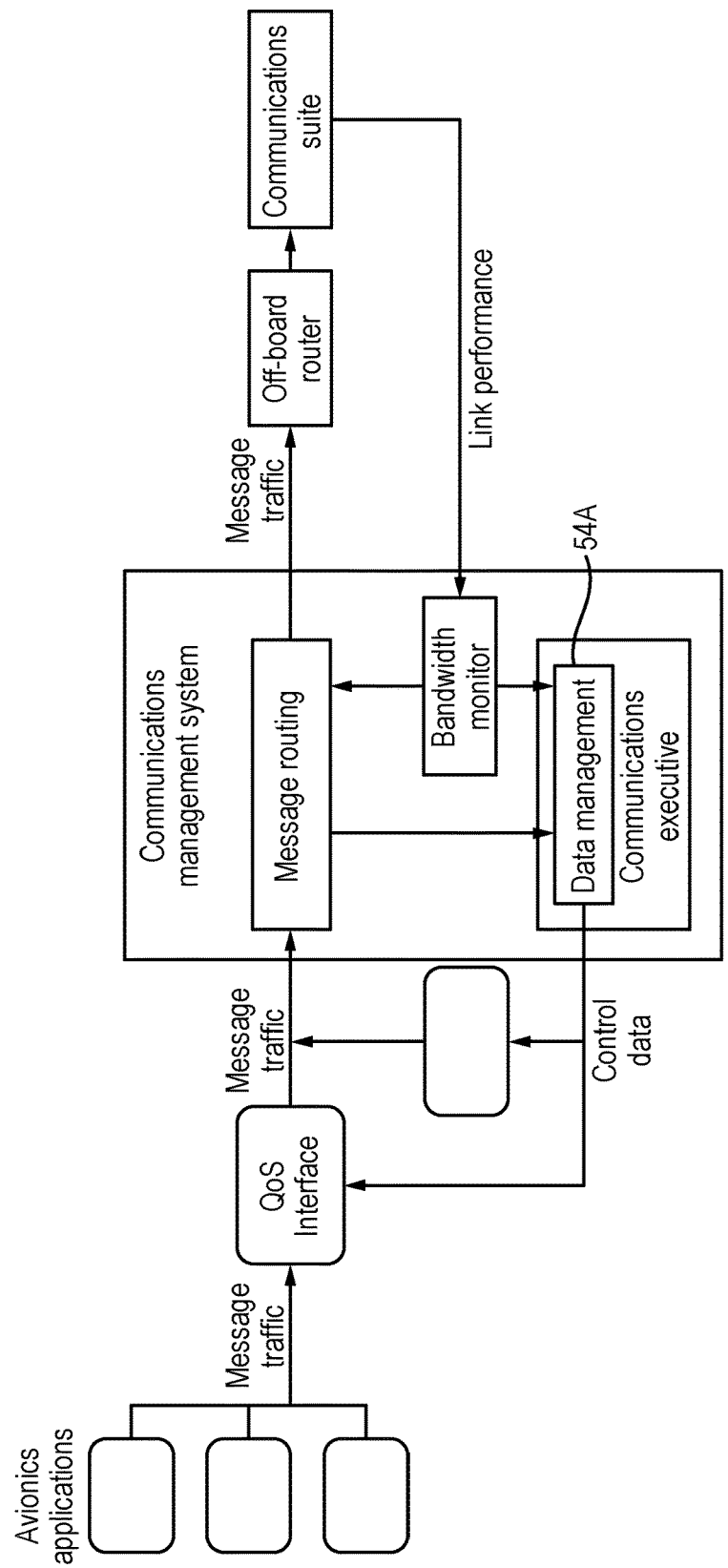

Referring to FIGS. 5A and 5B of the drawings, and as explained above, the Communications Management System 42 includes a Communications Executive function 141 for facilitating higher level communications planning and for interfacing with the platform transmitting applications as described above. As illustrated in FIG. 5A, a data management module resides within the Communications Executive function 141 and another data management module resides within the message routeing function 50; the bandwidth monitor 54 and message routeing function 50 interface with the Communications Executive function 141. In FIG. 5B, in other exemplary embodiments, a data management module resides within the Communications Executive function 141, and the bandwidth monitoring function 54 and the message routeing 50 function interface with the Communications Executive 141.

In normal use, message traffic from the various applications 14, 16, 18, 20 is transmitted via the message router 50 to an off-board router for wireless transmission over a selected communications link. In some cases, the message traffic from at least some applications may be transmitted to the message routeing function 50 via a Quality of Services (QoS) interface 19. The data management module 54a works in association with the platform applications 14, 16, 18, 20 (and optionally the QoS interface 19) to enable them to dynamically adapt their information to a new QoS level or scale to reduced level of service, according to control message received from the bandwidth monitor 54, to make best use of the available bandwidth. As a result, the applications become "network-aware". Optimising the bandwidth usage may include techniques such as compression and adapting the transmission data rate. A Platform Application can specify an acceptable bandwidth range. The application adapts to the specified point within this range that the network provides, which may change with time. In effect, the data management module "interfaces" with platform applications and/or QoS interface to enable them to adapt to prevailing network conditions by adapting their information. In some cases, the applications themselves will have the capability to adapt their information for transmission, in accordance with control message received from the information management module 54a. In other cases, where an application does not have this capability for example, it is envisaged that adaptation may be effected by the QoS interface 19.

A platform application may be informed if its message has not been transmitted and/or expired due to insufficient or unavailable network resources, so that it can take the appropriate action. The data management module 54a (within the Communications Executive 141) or 54b (within the message routing module 50) consults its policy (e.g. a look-up table based on Message Type/Class and/or Message Priority) to determine what action to take regarding the unsent or expired message. For example, an expired, non-critical health message has not been delivered, so the routeing function is caused to drop the message, but in this case the platform application need not be notified, since another message with up-to-date information will be sent in due course by the platform application. In another example, a platform application with mission critical information is informed of the loss of resources, so that it can store its information. In another example, a platform system may be informed, so that it can initiate a re-plan of some sort. The expiry parameter can be provided by the platform application with the message, via a wrapper, or within the message payload, or provided within a separate message, for example.

In yet another example, if a platform becomes disconnected, non-time sensitive message (e.g. delay tolerant) cannot be delivered. In which case, the non-time sensitive information can be stored on-board, as per policy, until an opportunity arises for it to be delivered, via a relay or directly to a recipient node. The data management module 54a will inform the platform application that it cannot deliver its message, such that the platform application itself can take the required action, in this case to store its information. In one exemplary embodiment, the data management module 54a may directly retrieve any stored messages when a communications link becomes available. In another exemplary embodiment, the data management module 54a may inform the relevant system, e.g. data storage system, that the network is available based on information received from the message routeing function for example and for the system to release the information.

Figure 6:
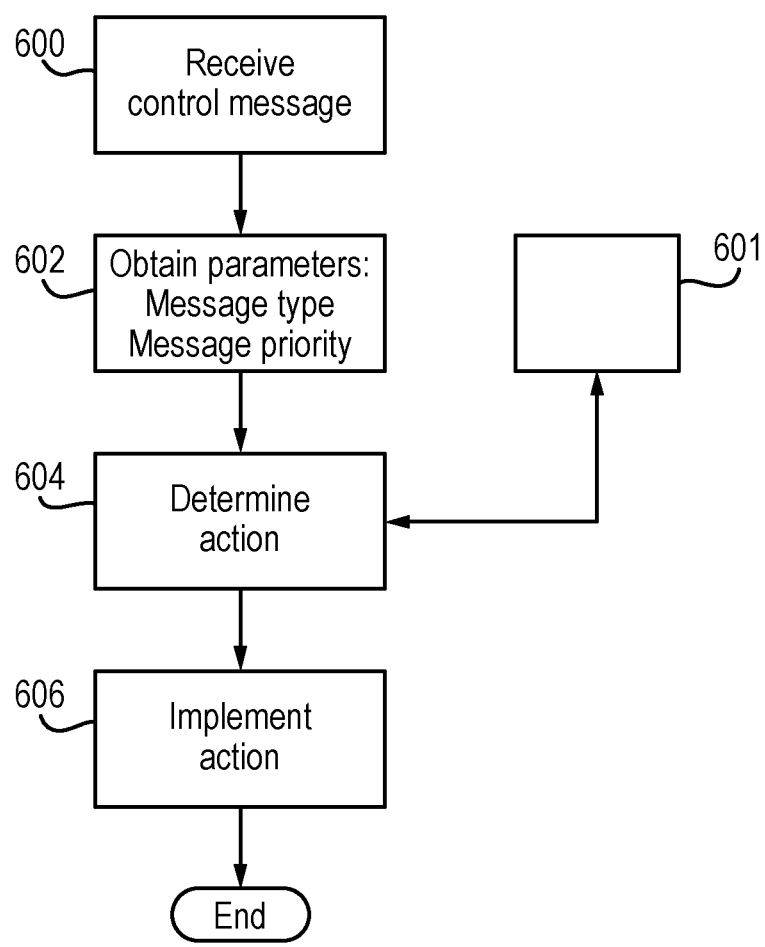
FIG. 6 is a flow diagram illustrating the steps of a data management method according to an exemplary embodiment of the present invention.

Referring now to FIG. 6 of the drawings, a method according to an exemplary embodiment of the present invention starts (at step 600) with a signal or other data from a communications management function (e.g. message routeing function or a sub-function thereof), that a message has expired, or a service cannot be provided (e.g. there are no suitable communications links) for a given message, or that network conditions have improved after having failed or degraded, for example. In another embodiment, signal or data about the network condition may be received from another communications function, such as the bandwidth monitor 54. Thus, the next step (602) is to obtain/identify the Message Type (or Message Class or other classification) and/or current message priority. The Message Type for each message provides information on what the message is trying to achieve. This step may obtain a Message Type parameter by extracting this information from the message, or from the data provided in step 600, for example. At step 604, the method proceeds to consulting a look-up table 601 (or similar stored ruleset) to retrieve appropriate actions to be taken in respect of each message based on Message Type or Message Class and/or current message priority. This step identifies the transmitting platform application, and/or QoS Interface and/or platform system (e.g. data storage system), which relates to the action to be taken for a message. At step 606, having retrieved the required action for each message, based on Message Type or Message Class and/or current message priority, the method proceeds to inform the relevant platform application and/or the QoS interface of the network state and/or platform system and/or inform the router function of the required action, so as to cause the required action to be taken. For example, it informs the platform application or the QoS interface that a service cannot be provided, for example, to cause it to take the necessary action e.g. to store its information. In another example, it informs the router function of the required action to take, e.g. discard the message. In yet another example, it informs the data storage system that service has been resumed to cause it to take the appropriate action, e.g. release the stored information for transmission.

It will be apparent to a person skilled in the art, from the foregoing description, that modifications and variations can be made to the described embodiments without departing from the scope of the present invention as defined by the appended claims.

The invention claimed is:

1. An apparatus for communications management in a communications system of a moving platform comprising a plurality of systems and/or functions and at least one platform application, said communications system comprising at least one transmitter for transmitting data received from said at least one platform application and being configured to effect wireless data communication thereof by means of one of a plurality of supported communications links, wherein said apparatus comprises a data management module configured to:
 receive a control message indicative that no suitable communications links are available for transmission of platform application data;
 obtain a classification in respect of platform application data to be transmitted to at least one recipient node;
 determine, from a stored ruleset, an action to be taken in respect of said platform application data according to said respective classification thereof, wherein said action comprises one of storing or discarding said platform application data; and
 generate a control signal and transmit said control signal to a platform application from which said platform application data originates, or a QoS interface associated therewith, wherein said control signal is configured to cause said action to be taken thereby
 wherein said control message is representative of a network condition above or below a performance threshold in respect of one or more wireless communications links, wherein said performance threshold is set to a level at which communications are degraded, but not impossible.

2. The apparatus according to claim 1, configured to identify said platform application from which said platform application data originates, or a QoS interface associated therewith, and determine the address thereof, prior to transmitting said control signal thereto.

3. The apparatus according to claim 2, wherein said address is determined by accessing a look-up table.

4. The apparatus according to claim 1, configured to receive said control message from one or more wireless communications links and/or systems and/or functions of said moving platform.

5. The apparatus according to claim 1, wherein said actions include discarding said platform application data, transmitting said platform application data when an available communications link is identified, and informing a platform application from which said platform application data originated that a service cannot be provided for its messages.

6. The apparatus according to claim 1, including said stored ruleset containing data representative platform application data classifications and respective actions to be taken in respect thereof.

7. The apparatus according to claim 1, wherein said stored ruleset comprises a look-up table consisting of platform application data classifications, and respective actions to be taken in respect thereof.

8. The apparatus according to claim 1, configured to identify stored platform application data and determine if it has expired and, if so, generate a control signal configured to cause said platform application data to be discarded or re-transmitted.

9. The apparatus according to claim 1, configured to receive a further control message indicative that a suitable communications link is subsequently available for transmission of platform application data, and, in response to said further control message, generate a further control signal configured to cause a data storage system of said platform to release stored platform application data and cause subsequent transmission of said platform application data to resume.

10. A method for communications management in a communications system of a moving platform comprising at least one platform application, said communications system comprising at least one transmitter for transmitting data received from said at least one platform application and being configured to effect wireless data communication thereof from said transmitter by means of one of a plurality of supported communication links, the method comprising:
 receiving a control message indicative that no suitable communications links are available for transmission of platform application data;
 obtaining a classification in respect of platform application data to be transmitted to at least one recipient node;
 determining, from a stored ruleset, an action to be taken in respect of said platform application data according to said respective classification or message priority thereof, wherein said action comprises one of storing or discarding said platform application data; and
 generating a control signal and transmitting said control signal to a platform application from which said platform application data originates, or a QoS interface associated therewith, wherein said control signal is configured to cause said action to be taken thereby
 wherein said control message is representative of a network condition above or below a performance threshold in respect of one or more wireless communications links, wherein said performance threshold is set to a level at which communications are degraded, but not impossible.

11. An apparatus for communications management in a communications system of a moving platform comprising a plurality of systems and/or functions and at least one platform application, said communications system comprising at least one transmitter for transmitting data received from said at least one platform application and being configured to effect wireless data communication thereof by means of one of a plurality of supported communications links, wherein said apparatus comprises a data management module configured to:
- receive a control message indicative that no suitable communications links are available for transmission of platform application data;
- obtain a classification in respect of platform application data to be transmitted to at least one recipient node;
- determine, from a stored ruleset, an action to be taken in respect of said platform application data according to said respective classification thereof, wherein said action comprises one of storing or discarding said platform application data;
- generate a control signal and transmit said control signal to a platform application from which said platform application data originates, or a QoS interface associated therewith, wherein said control signal is configured to cause said action to be taken thereby; and
- receive a further control message indicative that a suitable communications link is subsequently available for transmission of platform application data, and, in response to said further control message, generate a further control signal configured to cause a data storage system of said platform to release stored platform application data and cause subsequent transmission of said platform application data to resume.

* * * * *